June 25, 1963 B. C. YEARLEY ETAL 3,094,749
MOLDING MACHINE
Filed May 9, 1960 5 Sheets-Sheet 2

INVENTORS
BERNARD C. YEARLEY
CHARLES E. NORTON
BEAUFORD E. GAVIN

Henry Kozak
ATTORNEY

June 25, 1963   B. C. YEARLEY ETAL   3,094,749
MOLDING MACHINE
Filed May 9, 1960   5 Sheets-Sheet 3

INVENTORS
BERNARD C. YEARLEY
CHARLES E. NORTON
BEAUFORD E. GAVIN

ATTORNEY

United States Patent Office  3,094,749
Patented June 25, 1963

3,094,749
MOLDING MACHINE
Bernard C. Yearley, Shaker Heights, Ohio, Charles E. Norton, Highland Park, Ill., and Beauford E. Gavin, Indianapolis, Ind., assignors to National Castings Company, a corporation of Ohio
Filed May 9, 1960, Ser. No. 27,772
11 Claims. (Cl. 22—43)

This invention relates to the manufacture of molded articles and is of particular use in making molds of sand composition suitable for casting metal.

In particular, the present invention is directed to more efficient use of the reversible pattern plate, known in many foundries as a "match plate," and in other foundries as a "vibrator plate" because of the compressed air device associated with this type of pattern plate for simultaneously loosening it from both "halves" of a newly made mold.

Conventionally, the pattern plate is generally of metal with opposite "halves" of the pattern occurring on opposite sides of a metal plate with which the pattern halves are integrally formed. A characteristic of the pattern plate of basic utility in the practice of the present invention is the accurate alignment of one half of the pattern with the other in a direction perpendicular to the plane of the plate. In the conventional use of the plate, the cope and drag halves of a mold are made in sequence without the first-made mold half being separated from the plate. When the plate is removed from between both halves, they fit together complementally accurately.

It is well known that tooling for match plate operation is less expensive than, for example, for mold production by separate cope and drag patterns and is therefore better adapted for manufacturing of like-cast metal articles in small numbers. Use of the match plate entails the production of complete molds from a single molding machine in one-by-one order. The process of producing each mold by match plate pattern, as now practiced, further entails sequential forming of the mold halves to the pattern. This necessitates various handling operations, e.g., the separate steps of assembling the plate, drag flask, and cope flask; applying sand to the flasks in separate operations; inverting the drag flask and plate; applying the bottom board; and separating each flask and the mold half contained therein from the match plate for the removal thereof from between the mold halves.

Conventionally, the preliminary forming of the drag half occurs before inversion of the drag flask and the match plate, and is ordinarily effected by jolting. At this time, the match plate is supported adjacent its periphery on an inverted cope flask but the area of the plate inwardly from such periphery is unsupported. Because of the lack of strength of the match plate, the drag half of the mold cannot be completely compacted prior to the inversion of the drag flask and the plate. Instead, the jolted drag flask receives a "bottom board," the drag flask, plate, and cope flask assembly is inverted to cope side up, sand is placed in the cope flask, and the drag and cope halves of the mold are pressed into a firm condition between a downward-facing platen applied to the sand contained in the upper cope flask and the upward-facing platform of a mold-making machine.

Hence, a primary object of the invention is to provide method and apparatus involving the use of match plate patterns for more efficient manufacture of disposable type foundry molds.

Another object is to provide a system for molding a plurality of foundry sand mold-halves simultaneously on a single machine by the use of a plurality of match plate patterns which may be instantly inverted for making either drag halves or cope halves as desired. It is desired to make groups of such mold halves while avoiding the heavy assembly and inverting operations which would result in attempting to apply conventional match-plate molding practices to the manufacture of mold halves in simultaneously formed groups.

Still another object is to provide a system for simultaneously molding a plurality of mold halves over a plurality of pattern match plates which may vary among themselves as to contour of the pattern and thickness of the plate portion.

A still further object is to provide a system in accordance with the foregoing object in which, regardless of the variation and thickness of the plates, drag or cope mold halves may be formed with respect to a reference plane of fixed location in a molding machine to insure accurate mating of corresponding mold halves.

It is also an object to provide a molding machine in accordance with the foregoing object comprising an under-support or a plurality of pattern plates that is infinitely adjustable to the thickness of the plates and the contour of their undersurfaces, and acts simultaneously on such undersurfaces to provide completely uniform unit-area support.

The present invention is made in furtherance of the above objects and others apparent from the description that follows and, in brief, comprises method and apparatus utilizing an invertible frame within which may be attached one or more match plate patterns, and further contemplates supporting such a frame with the undersides of any match plate patterns mounted therein in direct hydraulic relation with the upper surface of a rigidly contained body of liquid while molding a material in conformity with the upward-facing surface of the patterns.

A further feature of the invention is the construction of parts of a mold flask, the frame, and the match plate pattern which cooperate, when the flask is placed on top of the frame having patterns therein supported by the liquid, to establish a plane necessarily coplanar with an undersurface of the flask and the upper surface of the plate portion of the pattern. Such a plane is thereby fixed in the molding machine and enables accurate formation of a mold-half with respect to its parting face regardless of the thickness of the plate portion of a match plate pattern.

In the drawing in respect to which the invention is described in detail below.

EMBODIMENT A (FIGS. 1 TO 9)

Figure 1:
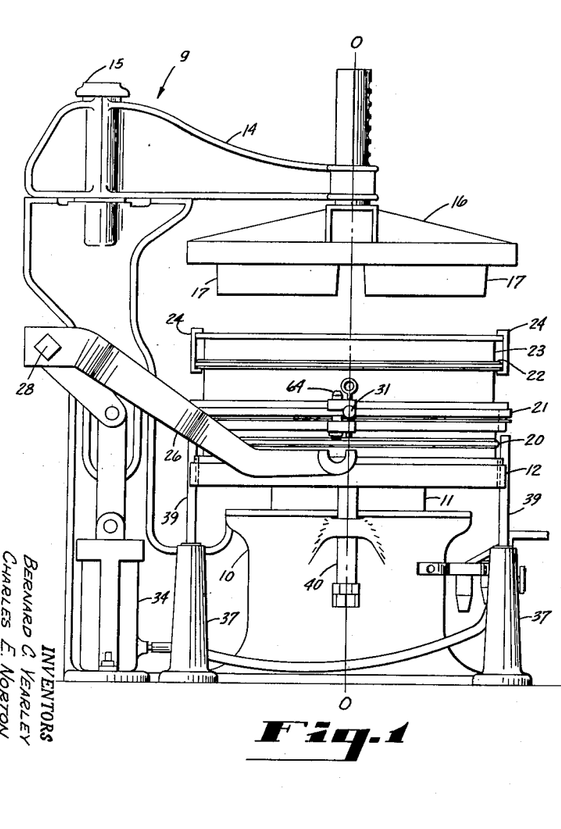
FIG. 1 is a side elevation of equipment including a molding machine incorporating the novel structure of this invention.

FIG. 1 illustrates a generally conventional molding machine comprising a base cylinder 10 receiving a "squeeze" piston 11 for raising and lowering a table 12 during squeeze operations. The piston 11 may also function as a cylinder for a jolt piston concealed therein and fixed to the underside of the table. The table 12 (known then as a jolt table) is reciprocable relative to the piston 11 for sand jolting operations. The machine 9 further comprises an overhead arm 14 horizontally pivotable with respect to a supporting post 15 therefor. The arm 14 supports a squeeze head 16 having a plurality of pressing elements 17 for entering a molding flask partitioned in accordance with the present invention.

Figure 6:
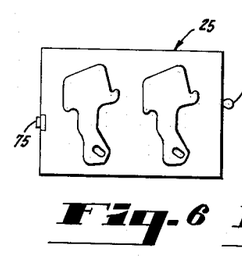
FIG. 6 is a plan view of a match-plate pattern adapted for use with the frame of FIG. 4.
Figure 7:
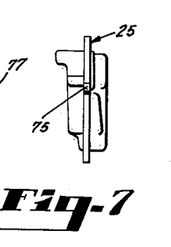
FIG. 7 is an end view of the pattern of FIG. 6.

Accurately positioned on the top surface of the table 12 is a box-like liquid container 20. Resting on a top edge surface 19 of the lateral wall of the container 20 is a frame 21 hereinafter described in further detail as an implement for supporting a plurality of match-plate patterns 25 (FIGS. 6 and 7). Resting on top of the frame 21 is a flask 22. An upset 23 is secured to the top edge of the flask by means, such as clamps 24, for the conventional purpose of cooperating with the flask to receive an initial charge of sand in adequate amount to make a mold. The machine 9 has side arms 26 and 27 pivoted on an axle 28 at the rear of the machine and extending forwardly into a position underneath trunnions 31 and 32, respectively, of the frame 21.

The side arms 26, 27 are rotatable into engagement with the trunnions by a pneumatic cylinder 34 and a lever system interconnecting the arms and the cylinder. These side arms are similar in construction and operation to those employed on prior art machines for lifting flasks free of the patterns. In the present invention, the arms 26, 27 are used to lift the frame 21 to a position free of the container wherein it may be rotated relative to the arms to an inverted position. However, to effect an inversion of the frame in the machine illustrated, it is necessary to first swing the press head 16 about the post 15 out of overhead relation with the container 20.

In the presently described embodiment, the flask 22 is lifted free of the frame 21 and the match plate patterns 25 carried therein by conventional pneumatic pin lifters 37. These lifters comprise pneumatic cylinders 38 and piston pins 39 of which the upper ends engage the bottom surface of the flask 22 during a flask-lifting operation. The frame 21 and laterally protruding flange portions of container 20 are appropriately notched along respective peripheries as shown at 59, 61 and 62, to receive the pins 39 of the lifters in a position of vertical alignment with the undersurface of the flask 22.

In a conventional manner, the jolt table 12 is precisely guided in its vertical movements by a pair of parallel guides 40 anchored fixedly in the table extending from the underside thereof in guide relation with bearing portions 41 of the base cylinder 10.

In the molding machine 9 generally described above, the novel structure thereof is found primarily in those portions disposed between the upper surface of the platform 12 and the squeeze head 16.

Pattern Supporting Container

Figure 5:
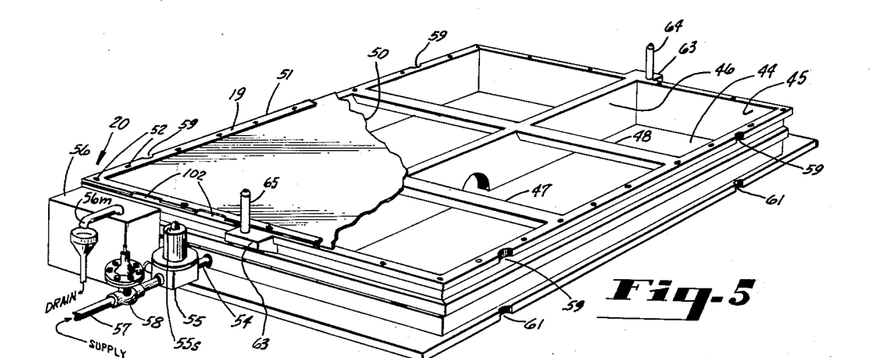
FIG. 5 is a perspective view of a liquid container (with the liquid removed) used for supporting the frame of FIG. 4 and associated match-plate patterns.

With attention in detail now to the construction of one of such portions as shown in FIG. 5, the container 20 has a rigid bottom or floor 44, a rigid lateral wall 45, a partitioning wall or web 46 extending between one pair of opposite sides of the wall 45, and cross bars 47, 48, extending between the remaining pair of opposite sides of the wall 45. The cross bars and partitioning web are optional but are preferred because of the added rigidity and strengthening they impart to the container as a whole, and the support they impart under some conditions to a flexible elastic diaphragm 50 of rubber or rubber-like material.

The diaphragm 50, of which a fragment is shown, is supported over the entire grid surface formed by the top surfaces of the wall 45, the bars 47, 48, and the partitioning wall 46. The diaphragm is secured to the top of the container by a rigid gasket 51 complementary to the top surface of the wall 45 and fastened thereto by means such as screws 52 extending into the wall. The diaphragm 50 is scured tightly and continuously to the upper end of the wall in such a manner as to make a sealed pressure-resistant, liquid-tight joint therewith.

During use, the container 20 is full of liquid. Filling of the container is conducted to carefully avoid any entrapment of air or other gas under the diaphragm 50. While the invention is to be practiced with practically a constant volume of liquid in the container, the pressure of the liquid will vary from approximately atmospheric value, when the upper diaphragm surface of the container is exposed, to a predetermined super-atmospheric value when the frame and plate patterns carried therein are in place over the container in hydraulic pressure relation with the diaphragm as during a mold-forming operation. Such changes of pressure may be accompanied by slight changes in the volume of liquid stored in the container as the result of the deflection of the diaphragm in adjusting the pattern plates upwardly relative to the frame against the bottom surface of the flask 22. Volume changes result also from protrusion of the patterns into the container below the normal diaphragm level, i.e., below the top surface of the container wall 45.

For the regulation of such volume and pressure changes of liquid, the container 20 is provided with a supply and exhaust duct 54 secured to the wall 45 in communication with the interior of the container and terminating in an exhaust port of a conventional, normally-closed three-way valve 55. The valve 55 has another exhaust port connecting with a reservoir tank 56, and an inlet port connecting with a supply duct 57 through a pressure regulating valve 58. The valve 55 may be operated, as shown by a solenoid 55a. In its normally-closed condition, the valve 55 maintains its inlet port shut. Its two outlet ports are thus in communication internally of the valve 55 thereby permitting interchange of liquid between the container 19 and the reservoir 56 in either direction. In the open condition of the valve 55, liquid flows from the supply line 57 through the regulator 58 and through the exhaust port of valve 55 into the container 19; the exhaust port to the tank 56 is closed. The valve 55 is a well-known type, such as White Model 1373B5009 manufactured by the Ross Operating Valve Co. of Detroit, Michigan. The pressure regulating valve 58 is a low-pressure type, common to the valve art adapted for pressures of less than 50 pounds per square inch and capable of maintaining a desired control pressure lower than the supply pressure when there is no flow therethrough.

The reservoir tank 56 has an outlet 56m disposed approximately at the level at which the diaphragm 50 is secured to the container wall 45. The tank 56 functions as an expansion chamber for exchanging liquid with the container as the result of deflections of the diaphragm 50 in placing the frame-21-and-pattern 25 assembly in molding position or in removing this assembly from the container 20. Assuming the valve 55 to be in closed position, liquid flows from the container into the tank 56 when the frame-and-pattern assembly is placed in the container because the diaphragm is deflected downwardly. When this assembly is removed, the inherent elasticity of the diaphragm and head of liquid in the tank 56 cause liquid to flow from the tank into the container 20.

A further important feature of the container 20 is structure for obtaining accurate vertical alignment of the frame 21, the flask 22, and the container during molding operations. For this purpose the container comprises cleats or lugs 63 fixed to and extending laterally outwardly from opposite sides of its top flange portion of the container, and cylindrical pins 64 and 65, each fixed to and extending upwardly from one of the lugs 63.

The Pattern Supporting Frame

Figure 4:
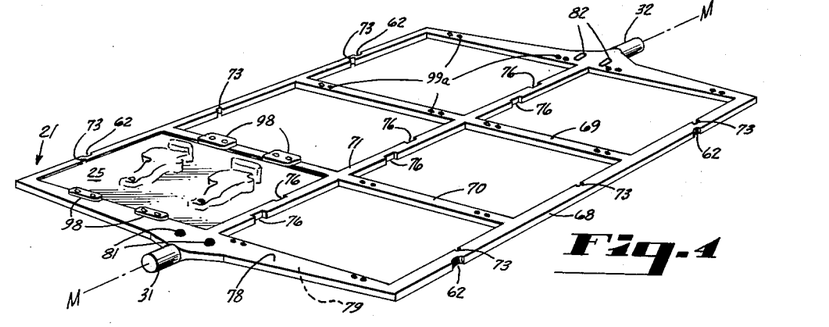
FIG. 4 is a perspective view of a frame for supporting match-plate patterns.

The frame 21, as shown perspectively in FIG. 4, is of flat grid construction comprising an outer peripheral rectangular portion 68 and cross bars 69, 70, and 71 defining 6 openings adapted for receiving an equal number of match-plate patterns typified by pattern 25 of FIGS. 6 and 7. The elements of the frame defining each opening form an inner periphery closely complementary to the outer periphery of the pattern plate received therein, such as to permit little or no horizontal movement of the pattern plate relative to the frame. Frame 21 is of the invertible type, having its opposite face surfaces 78 and 79 substantially identical in outline and extending in parallel planes so that they are alternately engageable with the washer 51 of the container or the bottom surface of the flask 22. In the specific embodiment as shown, the thickness of the frame, i.e., the distance between the two faces thereof, is greater than the thickness of a peripheral marginal portion of the pattern plate as shown most clearly in FIG. 8. As shown, the outer rectangular portion of the frame has an arcuate-shaped recess 73 in the periphery of each opening defined by the frame. Each recess 73 has a horizontal cross section in the shape of a flat-sided circle, i.e., the recess is defined by an arcuate surface of greater than 180° in angular length to trap a boss 75 of complementary arcuate shape on the pattern plate 25.

The cross bar on the side of each opening opposite the recess 73 defines a rectangular recess 76 adapted to receive a rectangular boss 77 complementary thereto, protruding laterally from the periphery of pattern 25 on the side thereof opposite to the side supporting the boss 75. This arrangement of bosses and recesses permits loose vertical freedom of movement of each of the pattern plates supported therein relative to the frame in a direction normal to the planes of the face surfaces 78 and 79. The boss 75 and its respective recess 73 cooperate to hold the associated end of the pattern plate close to the side of the frame opening which defines the recess 73. Thus, the pattern plate may expand or contract lengthwise toward and away from the recess 76 at the opposite side of the opening in response to differences in heating and cooling of the frame and the pattern plate. The dimensions of the pattern plate, at room temperature, are sufficiently less than the dimensions of the frame opening in which it is supported to avoid binding with the frame in any horizontal direction as a result of temperature differences encountered in molding operations.

The frame 21 further comprises cylindrical trunnions 31 and 32 disposed in concentric relation with the longitudinal axis M—M of the frame. Adjacent each trunnion are a pair of openings through the frame spaced equidistant from the axis M—M. Openings 81 adjacent the trunnion 31 are circular with the axes of revolution thereof normal to the surfaces 78 and 79. Each opening 81 is adapted to fit slidably but without appreciable clearance around one of the posts 64 or 65 of the container 20. The pair of openings 82 adjacent the trunnion 32 are spaced center-to-center from the openings 81 approximately the distance separating the posts 64 and 65. The openings are elongated in directions parallel to the axis M—M with the narrower dimension thereof, i.e., the one extending transversely of the axis M—M, equaling the diameter of the posts 64 or 65 normally extending therethrough. Elongation of the openings 82 permits thermoexpansion of the frame relative to the container 20 or the flask 22 in relation to the diametrically opposite flattened portions of the adjacent flange.

The Flask

Figure 3:
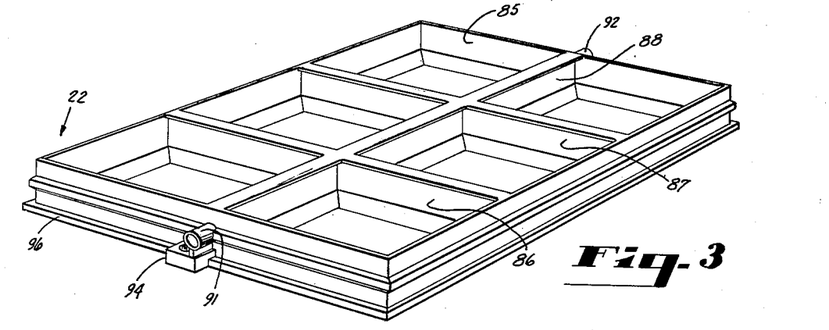
FIG. 3 is a perspective view of a molding flask adapted to the invention.

The flask 22 is illustrative of either cope or drag flasks that may be employed in the practice of this invention. Such a flask may be constructed for molding one or more mold halves during one molding operation. As shown, the flask 22 is constructed with six openings adapted for registry with six match-plate patterns 25 carried in the frame 21. The flask 22 comprises a peripheral rectangular lateral wall 85 and cross-partitioning walls 86 and 87 intersecting with a longitudinal partitioning wall 88. The partitioning walls join with the lateral wall 85 to form the six aforementioned openings of the flask. In accordance with "tight flask" practice, the lower portions of the walls 85 to 88 are flared inwardly in a downward direction to taper the bottom portion of each opening whereby the mold halves are entrapped in the flask after being packed to a self-supporting hardened condition enabling the flask and the molds carried therein to be handled as a unit during subsequent handling and casting operations.

Figure 2:
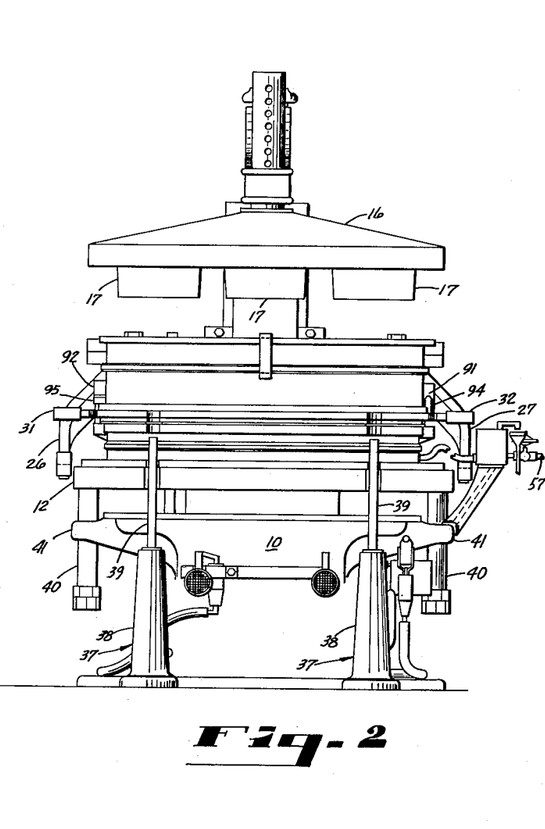
FIG. 2 is a front elevation of the equipment shown in FIG. 1.

The flask 22 also comprises hollow trunnions 91 and 92 by which the flask may be attached to a crane or other lifting device and transferred to and from the molding machine. Underneath each trunnion 91, 92 are side lugs 94, 95 joining at opposite sides of the flask with a lower flange portion 96 of the wall 85. Preferably, lugs 94 and 95 are integral with the wall 85. Each lug has a hole which aligns with one of each pair of holes 81, 82 of the frame 21 for receiving the pegs 64 and 65 of the container 20 during a molding operation, as shown in FIGS. 1 and 2. The hole of one of the lugs 94 or 95 is elongate in the same pattern as frame holes 82 to permit longitudinal expansion of the flask relative to the aligning pegs 64 and 65. In practice, the elongated hole in the flask lug will be superimposed with one of the elongated holes 82 of the frame to cause the flask and the frame to expand in the same longitudinal direction. As shown in FIG. 1, the container 20, the frame 21, and the flask 22 are aligned vertically with respect to a vertical plane O—O of symmetry. Also, the jolt table 12, the container, the frame, the flask, and the squeeze head 16 are substantially centered in the forward-to-rearward direction of the machine with respect to the plane O—O. As a result, the pegs 64, 65 and the holes therefor in the frame and the flask are spaced equidistantly from the plane O—O.

In operative position of these components of the machine, the plane O—O extends vertically through the entire length of cross-bar 71 of the frame and longitudinal partitioning wall 88 of the flask.

Figure 8:
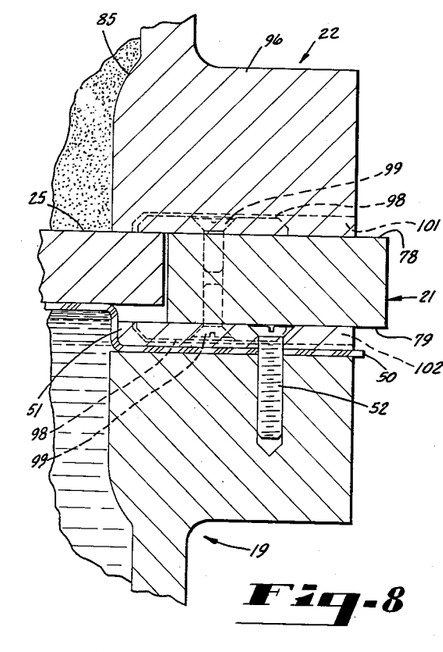
FIG. 8 is a fragmentary elevation in section of the apparatus of FIGS. 3 to 6 in assembled relationship.
Figure 9:
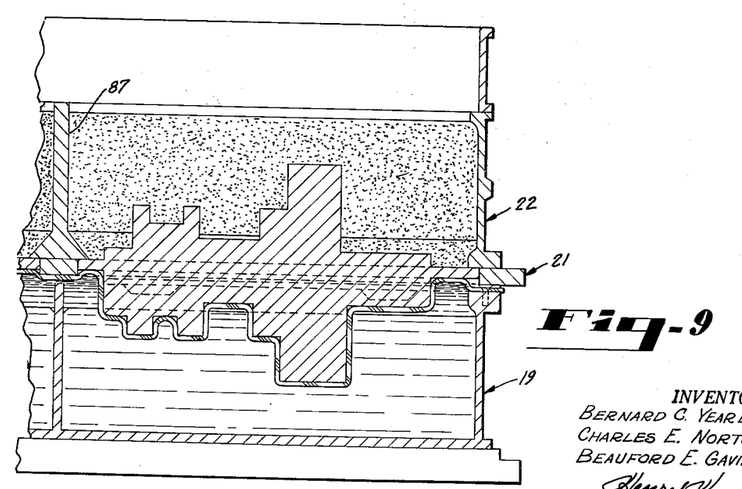
FIG. 9 is a fragmentary longitudinal section of an assembly including the apparatus of FIGS. 3 to 5 and an upset atop the flask showing a diaphragm supported by liquid along the underside of a match-plate pattern.

As illustrated most clearly in FIG. 8, the inner periphery of the flange portion 96 of the wall 85 is smaller than the inner periphery of the rectangular outer portion of the frame 21. However, the inner periphery of the frame portion just mentioned is less than that of the outer periphery of the flange portion. As a result, the flange portion 96 stands inwardly over the openings of the frame in overlapping relationship with the peripheral marginal portions of the match plate patterns 25. In a similar way, the flared lower end portions of the partitioning walls 86, 87, and 88 overlie the cross-bars of the frame and overhang adjacent marginal portions of the patterns 25. By this arrangement, a continuous peripheral portion of each match plate pattern 25 occupying an opening of the frame is horizontally overlapped by a continuous marginal portion of rectangular outline of the bottom surface of the flask adjacent each opening thereof. Also, all portions of the frame surrounding the pattern are in bearing contact with the undersurface of the flask so that the frame 21 is firmly supported by the undersurface of the flask from upward deflection.

A basic reason for enabling the pattern plates and the frame to simultaneously engage the undersurface of the flask in a common, horizontal plane is to assure that the face surface of each mold-half, whether it be cope or drag, is formed accurately to the plane of the bottom surface of the flask regardless of the thickness of the pattern plate. That is to say, mold-halves formed to either side of the frame and pattern assembly will necessarily have their parting faces in the plane of the bottom surface of the flask. In furthering this practice, it is highly desirable that the marginal portions of the patterns disposed for engaging the undersurface of the flask be accurately formed to a plane in order to obtain accurate mold-half faces permitting good contact along the parting plane of the mating cope and drag halves.

It will be noted in FIG. 8 that the marginal portion of the pattern 25 is of less thickness than the frame 21. This figure depicts the diaphragm 50 as subjected to hydraulic pressure by a liquid filling the container 20 and forcing the diaphragm upwardly against the pattern. The pattern is thus disposed at the upper limit of its travel relative to the frame against the undersurface of the flask 22. Obviously, if the frame 21 was inverted, a diaphragm 50 would act in a similar manner to force the upperside of the pattern (previously the underside as shown in FIG. 8) into engagement with the undersurface of the flask. As further shown in this figure, the frame has cleats 98 fastened to the opposite sides thereof by screws 99 for supporting the patterns 25 within the frame openings, particularly when the frame and patterns are lifted free of the molding machine.

In the presently described embodiment, each pattern is supported in the frame by eight cleats; each cleat 98 being secured by two screws, the location of which is indicated in FIG. 4 by the various pairs of screw holes 99a illustrated. As shown in FIG. 8, the bottom surface of the flask has a recess 101 and the washer 51 has a recess 102 in vertical alignment with each cleat 98 of a suitable depth to fully accommodate the cleat and allow the upper and lower surfaces of the frame to engage the bottom surface of the flask and the top surface of the container, respectively.

EMBODIMENT B

Figure 10:
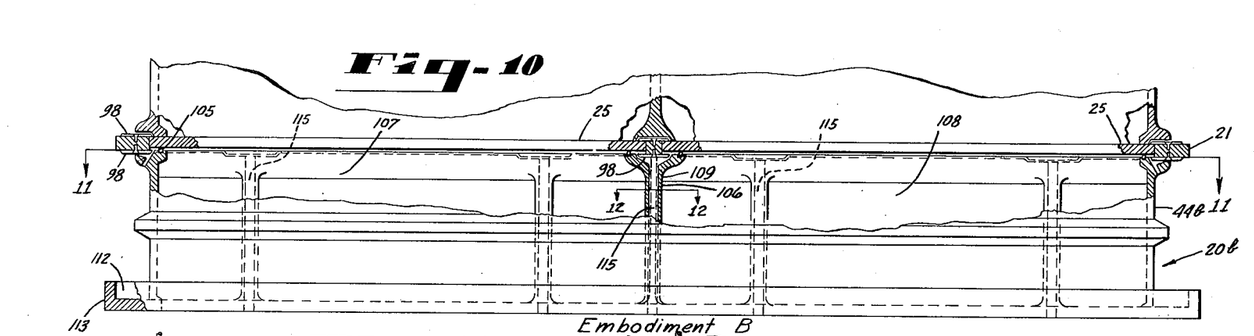
FIG. 10 is a fragmentary longitudinal elevation of a modified embodiment of the invention.

The embodiment now to be described differs from embodiment A primarily in the construction of the container 20b. The frame 21 and the match plate patterns 25 may be identical with those employed in embodiment A. The container 20b has no diaphragm analogous to the diaphragm 50 of embodiment A. Containment of liquid in the container 20b for molding operations is obtained by utilizing each pattern plate supported in the frame, and an O-ring 105 squeezed between the undersurface of a continuous marginal portion of each pattern 25 and the top surface of the container walls disposed immediately under such marginal portion of the pattern, as a closure for each opening of the container circumscribed by external and internal walls theerof.

An important consideration in the use of embodiment B is the necessity for manufacturing mold-halves therefrom without moisture pick-up from the container. Consequently, the pattern plates are utilized as closures without utilization of any portion of the frame 21 to avoid any passage of liquid from the container through the loose connection of the patterns with the frame upwardly into the region above the patterns. To avoid any transfer of moisture directly through to the patterns as the result of the porosity thereof, the opposite surfaces of the patterns are coated with a wax or other coating material capable of forming a moisture-impervious film. Recommended for this purpose are various film-forming silicone compositions which are useful also as a mold-release agents.

In practicing the invention with embodiment B, it is highly desirable to drain away any liquid which may overflow the top of the container 20b. In order to avoid the introduction of air under the patterns placed along with the frame 21 in operative position over the container, it is desirable to have the container 20b completely full of liquid before placing the pattern-and-frame assembly thereover. As the body of the pattern necessarily projects away from either surface plane of its plate-like peripheral marginal portion, the patterns displace water from the filled container outwardly over the O-ring 105. To drain away such liquid in a controlled manner, the upper portions of the peripheral lateral wall 44b and all interior partitioning walls such as walls 106, 107, and 108 are horizontally enlarged at their top edges to provide structure defining a canal and drainage duct system for leading excess liquid away from the mold-forming region.

Figures 11, 12, 13:
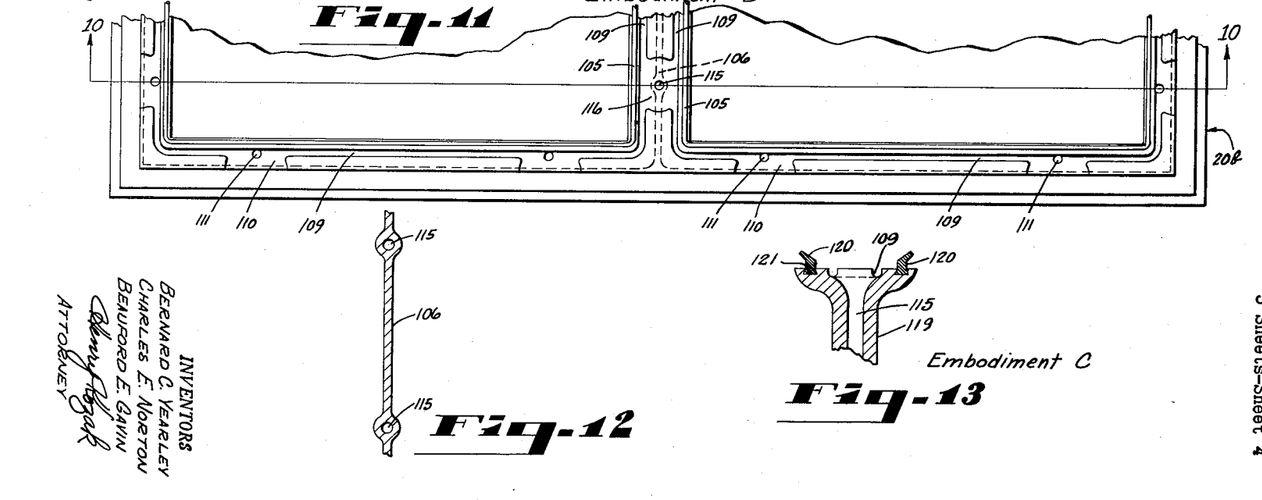
FIG. 11 is a fragmentary plan view of part of the apparatus illustrated in FIG. 10.
FIG. 12 is a fragmentary horizontal section of a partition-wall of the liquid container of FIGS. 10 and 11.
FIG. 13 is a fragmentary vertical section of an intermediate wall for a liquid container of a modified embodiment.

FIG. 11 illustrates in plan view canals 109 which completely surround respective openings in the top of the container 20b. These canals, when the frame and associated patterns are in place, are directly under the periphery of a pattern and the adjacent inner periphery of the frame opening occupied by the pattern and receive any liquid overflowing the O-rings to prevent flow or seepage thereof upwardly between the adjacent vertical surfaces of the pattern and the frame. The canals are enlarged at 110 and 116, for example, to receive the cleats 98 carried on the frame 21. Ducts 111 extend downwardly from the canals to discharge liquid into a trough 112 formed by an upturned flange 113 at the base of the container 20b.

FIG. 12 is a fragmentary horizontal section illustrating a section of the partitioning wall 106 (illustrative also of walls 107 and 108) providing vertical drainage ducts 115 for receiving liquid from both adjacent canals overflowing thereinto from adjacent open-top areas of the container. The top surface of the wall 106 is recessed at 116 in an area surrounding the duct 115 which merges with the canals 109 and leads liquid into the drainage ducts.

EMBODIMENT C

FIG. 13 is illustrative of a partitioning wall 119 similar to the wall 106 incorporating an angle-shaped resilient sealing element 120 having a function similar to that of the O-ring 105 of embodiment B. As shown, the resilient element is received by the wall 119 within an inwardly flaring groove 121 which secures the element to the wall by entrapment of its lower portion.

EMBODIMENT D

Figure 14:
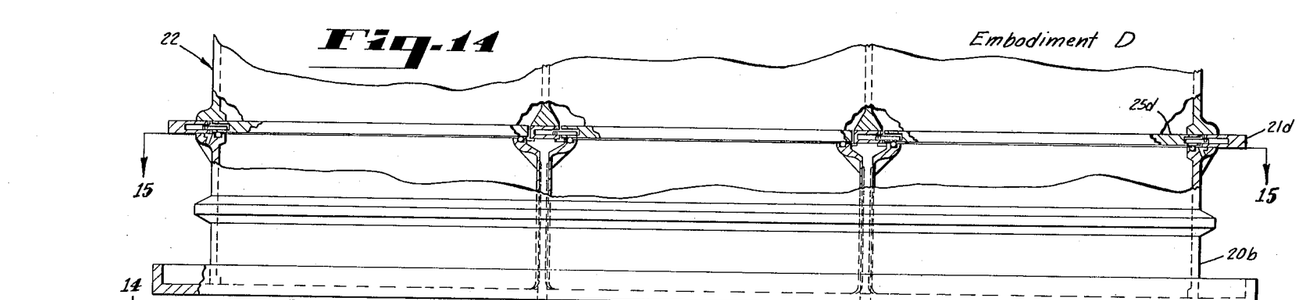
FIG. 14 is a fragmentary longitudinal elevation with parts in section of still another modification of the invention as viewed along line 14 of FIG. 15.

Embodiment D employs the container 20b of embodiment B but differs from the previous embodiments primarily in the construction of the frame 21d and the pattern plates 25d. The container is modified in a minor respect by including an inflatable O-ring 125 which replaces the solid ring 105 of embodiment B or the element 120 of angular cross section of embodiment C.

Figures 15, 16, 17, 18:
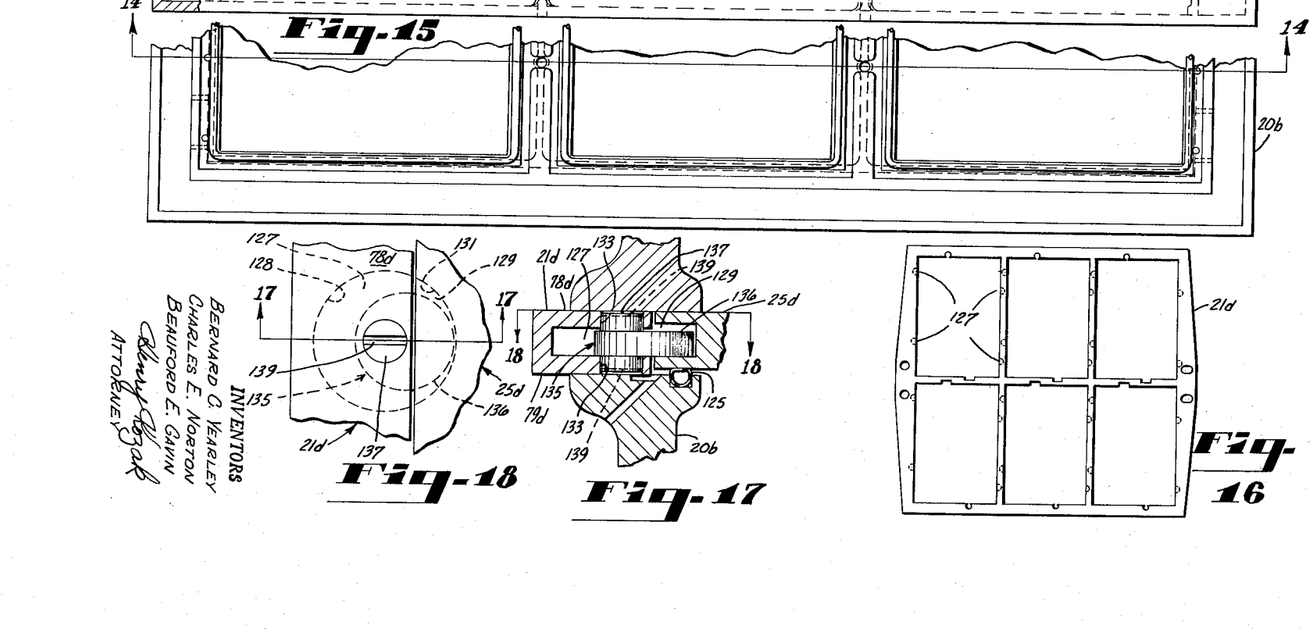
FIG. 15 is a fragmentary plan view of the liquid container of FIG. 14 as viewed along line 15.
FIG. 16 is a plan view of a modified frame for supporting especially adapted match-plate patterns to be used therewith.
FIG. 17 is a fragmentary elevation in section illustrating portions of the frame of FIG. 14, the flask and the liquid container of FIGS. 14 and 15 as viewed along line 17 of FIG. 18.
FIG. 18 is a fragmentary plan view of the frame and pattern of FIG. 17 as viewed along line 18.

Considering now the details of the modified frame 21d and the modified patterns 25d as shown in FIGS. 16, 17, and 18, the cleats 98 of the earlier embodiments, employed to secure the patterns within the frame, are eliminated. Consequently, the upper surface of the container and the bottom surface of the flask may be free, as shown, of the recesses 101 and 102 needed in the prior embodiments to accommodate the cleats.

With attention now to a single pattern-receiving opening of the frame 21d as illustrated in FIG. 16, four recesses 127 extending inwardly from perpendicular peripheral side surfaces of each opening. The recesses 127 are arranged in pairs in each of the two longer opposing sides of the opening. Each recess is defined in part by an arcuate surface 128. The recesses associated with the various openings are arranged in identical patterns to permit interchangeability of the patterns within the different openings of the frame. Each match plate pattern 25d used with the frame 21d has recesses 129, each defined in part by an arcuate surface 131. In a frame 21d with patterns 25d placed therein, each frame recess 127 has a corresponding pattern recess 129 in complementary opposed relation with the arcuate surfaces 128 and 131 of the two recesses forming a circle about a vertical axis passing through the frames sufficiently inwardly of the periphery of the adjacent pattern receiving opening to provide a coaxial bore 133 through the frame.

Each recess 127 houses a latch 135 comprising a flat disk portion 136 fixed to an axle portion 137 with respect to which the disk portion is eccentrically attached. The disk portion is circular with respect to a normally vertical axis parallel to the axis of the axle portion and the bore 133. The axle portion comprises two trunnions which occupy the bore 133 with the end surfaces thereof exposed along the opposite surfaces 78d and 79d of the frame. Each end surface of the axle portion has a slot 139 or other recess adapting the latch 135 to be rotated by screwdriver or other tool.

In emobdiment D the patterns 25d are movable relative to the frame in a vertical direction because the height of the recess 129 is greater than the vertical thickness of the disk portion 136 of the latch. The range of this relative movement is equal to the difference between the recess height and the disk thickness.

As clearly illustrated in FIG. 17, the range of movement permitted the patterns relative to the frame must be at least as great as the difference in vertical thickness of the frame and the peripheral marginal portions of the patterns which are received between the bottom surface of the flask 22 and the upper surface of the container 20b. In embodiment D the difference in the height of the recess 29 and the thickness of disk portion 136 is greater than the difference in the thicknesses of the frame 21d and the pattern 25d.

The dimensional relationships just described permit invertibility of the frame 21d and the associated patterns 25d, and, hence, the utilization of either side of this assembly for molding cope and drag halves. The frame and pattern assembly of embodiment D is completely adapted for use with the diaphragm type container 19 of embodiment A, with or without elimination of the recesses in the top surface thereof for the cleats 98.

The present invention also includes the use of match plate patterns which may be thicker than the frame. This is practical when the patterns are secured within the frame so as to permit relative movement therebetween, placing faces of the outer margins of the patterns and the frame facing on either side of the assembly in the flush relationship required for seating against the underside of a flask. In this arrangement, the top surface of the container is downwardly recessed to accommodate the greater thickness of the patterns to an extent permitting resting of the frame thereon.

An important feature of the invention obvious from all embodiments of the foregoing description is the structural arrangement by which the upper surface of a plurality of metal plate patterns of different thicknesses may be seated in a common plane against the undersurface of a molding flask by hydraulic means. The invention is thus useful in simultaneously producing foundry molds of different design in a single machine in a manner never heretofore appreciated in the art of metal casting.

The terms and expressions which have been employed are used as terms of description and not of limitation, and there is no intention of excluding such equivalents of the invention described or of the portions thereof as fall within the purview of the claims.

What is claimed is:

1. Equipment for making sand molds comprising: a molding flask having upper and lower open ends, and a bottom surface defining an opening through said lower end; an invertible frame defining an aperture conforming generally to said flask opening; said frame having an upwardly-facing surface having an internal periphery defining said aperture greater than the internal periphery of said bottom surface defining said opening; means for vertically aligning the flask and the frame to dispose a perimetrically continuous portion of the bottom surface overhanging said aperture; rigid means underlying the frame for supporting the frame and the flask when resting on the frame; a liquid rigidly contained within said rigid means except for its upper surface; and resilient means supported along the entire upper periphery of the rigid means adapted for engaging the undersurface of a match-plate pattern supported by the frame in said aperture, said resilient means cooperating with the rigid means, when engaging a pattern, to maintain said liquid in direct hydraulic relation and complete conformity with the undersurface of said pattern.

2. Equipment for making sand molds comprising: a molding flask having upper and lower open ends, and a bottom surface defining an opening therethrough; an invertible frame having similar upper and lower surfaces defining an aperture through the frame and conforming generally to the lower end of the flask; a match-plate pattern loosely mounted in said frame within said aperture; the frame and the pattern having adjacent peripherally continuous upward-facing marginal surfaces co-extensive with said aperture and arranged for simultaneously engaging a peripherally continuous lower end surface of the flask circumscribing said opening; rigid means underlying the frame for supporting the frame and the flask when resting on the frame; a liquid rigidly contained within said rigid means except for its upper surface; and resilient means supported along the entire upper periphery of the rigid means normally engaging the undersurface of the match-plate pattern to prevent escape of the liquid from a region enclosed by the rigid means and the pattern; said rigid means cooperating with the resilient means to maintain the liquid in direct hydraulic relation and complete conformity with the undersurface of said pattern.

3. Equipment for making sand molds comprising: a container having a rigid bottom and a rigid side wall terminating in a top surface extending perimetrically continuously in a horizontal plane; a molding flask open at its upper and lower ends having a perimetric side wall terminating in a planate bottom surface defining an opening and generally complementary to said top surface; a frame of uniform height horizontally defining an aperture, and having upper and lower planate surfaces fitting and adapted for alternately engaging, in substantially peripherally continuous contact, said bottom surface and said top surface, respectively; an inner periphery of said frame defining said aperture being greater than the inner periphery of said bottom surface defining said opening means for vertically aligning the flask and the frame to dispose a perimetrically continuous inner marginal portion of said bottom surface inwardly of said inner periphery of the frame and overhanging said aperture; a match plate pattern adapted for fitting within the frame in vertically loose relation therewith with its outer periphery in closely complementary relation to said inner periphery of the frame; said pattern having a peripheral marginal portion defined by planate opposite surfaces, and of greater width than said marginal portion of said bottom surface; fastening means connecting the frame and the pattern within said opening in limited vertically-movable relationship to enable adjustment to the pattern to a level placing the upward-facing surface of said marginal pattern portion in the same plane as the upward-facing surface of the frame; and resilient means supported by the container engaging the full perimetral length of the underside of said marginal pattern portion adapted to be compressibly confined thereagainst and to produce upward thrust on the pattern; said container pattern and resilient means cooperating with the container to seal the region enclosed thereby when said frame is confined between the the flask and the container and said region is filled with a liquid.

4. Equipment for making sand molds comprising: a container having a rigid bottom, and a rigid side wall terminating in a top surface extending perimetrically continuously in a horizontal plane; a molding flask open at its upper end and its lower end, and having a side wall terminating in a planate bottom surface generally perimetrically complementary to said top surface and having an opening therethrough; a frame fitting between said surfaces and having two parallel planate surfaces on opposite sides thereof defining an aperture therethrough, said surfaces of the frame having an internal perimeter defining said aperture larger than the internal perimeter of said bottom surface defining said opening; means for vertically aligning the flask and the frame to dispose said frame in perimetrically continuous contact with an outer margin of said bottom surface leaving the inner margin of said bottom surface overhanging said opening, and the other frame surface in opposed relation with said top surface; a match plate pattern fitting loosely within the frame and having an outer periphery closely complementary to the inner periphery of the frame; said pattern having a peripheral marginal portion of no greater thickness than the distance between said frame surface and of greater width than said inner marginal portion of said bottom surface; fastening means associated with the frame for securing the pattern within said aperture in limited vertically-movable relation with the frame to enable movement of the pattern relative to the frame between the planes of said frame surfaces; and resilient means supported by the container engaging the full perimetric length of the underside of said marginal pattern portion and, during operation, compressibly confined thereagainst and produce upward thrust on the pattern; said container, pattern, and resilient means cooperating to seal the region enclosed thereby when said frame is confined between the flask and the container and said region is filled with a liquid.

5. The equipment of claim 4 wherein: said top surface, said bottom surface, and said surfaces of the frame are symmetrical with respect to a vertical plane in an assembled condition of the equipment; and said frame is arranged for alternate relatively inverted positions between the container and the flask at said assembled condition.

6. The equipment of claim 4 wherein: said aligning means comprises two parallel posts of uniform horizontal cross section fixed to the container, said posts extending vertically upwardly from opposite container wall portions spaced lengthwise along said plane of symmetry; and the flask and the frame have vertically aligned apertures complementally occupied by one of said posts, and vertically aligned openings occupied by the other post; each of the latter openings having a pair of approximately parallel sides in close juxtaposition with the post received therebetween which elongate respective openings in directions horizontally parallel to said plane.

7. The equipment of claim 4 wherein: said side wall of the container terminates at its upper end as a rigid detachable gasket generally complementary to the upper end surface of the portion of said wall subjacent thereto; the resilient means is a flexible elastic diaphragm which encloses the upper end of said container and has a continuously peripheral marginal portion interposed between said gasket and said subjacent wall portion; and fastening means under tension connecting the gasket and said wall portion with said marginal diaphragm portion confined therebetween to seal a region from the atmosphere enclosed by the diaphragm and the lower wall portion.

8. Equipment for making sand molds comprising: a container having a rigid bottom and a rigid side wall terminating in a top surface extending perimetrically continuously in a horizontal plane; a molding flask having a side wall and a plurality of vertical webs terminating in a planate bottom surface and defining a plurality of openings extending vertically through the flask; a grid frame of uniform height comprising a belt portion and cross bars interconnecting therewith to horizontally circumscribe a plurality of apertures of horizontal outline similar to said flask openings; the frame being invertible and having similar upper and lower planate surfaces adapted for engaging in continuous contact said bottom surface along the peripheries of all said openings; the inner perimeter of the frame portion defining each frame aperture being larger than the inner perimeter of the corresponding superjacent portion of the flask to dispose a narrow marginal portion of said bottom surface in overhanging relation with said aperture along its entire perimeter; a match plate pattern for each frame aperture having an outer periphery closely complementary to that of its respective frame aperture; said pattern having a peripheral marginal portion of no greater thickness than the distance between said frame surfaces and of greater width than said marginal bottom surface portion; fastening means associated with the frame for securing each pattern within its respective frame aperture in limited vertically loose relation with the frame to enable movement of the patterns relative to the frame between the planes of said frame surfaces; and resilient means attached to the container in position for engaging the full peripheral length of the underside of said marginal portion of each pattern; said container, patterns, and resilient means cooperating to seal the region enclosed thereby when said frame is confined against the container by the flask and said region is filled with a liquid.

9. The method of making foundry molds comprising: rigidly supporting a body of liquid along the sides and bottom thereof; supporting a match plate pattern in fixed position over said body of liquid in direct pressure relation with the upper surface of the body to complete the rigid confinement of said body and to fix the volume of a gas-free sealed region occupied entirely by said liquid; supporting a molding flask in contact with the upper surface of a marginal portion of the pattern plate; placing a moldable material into the region enclosed by the flask and the pattern plate; and pressing downwardly on said material simultaneously along substantially all of its upper surface enclosed by the flask.

10. A method of making foundry molds comprising: supporting a match plate pattern against a bottom end surface of an open-bottom molding flask along the entire periphery of an opening in the bottom of the flask by a body of liquid substantially sealed from the atmosphere; supporting said body of liquid unyieldingly along all extremities thereof not confined by said pattern; placing a moldable material into the region enclosed by the flask and pattern; and pressing downwardly on said material simultaneously along substantially all of its upper surface enclosed by the flask.

11. The method of claim 10 comprising: preliminarily raising the pressure of said body a few pounds per square inch above atmospheric pressure before pressing the moldable material.

References Cited in the file of this patent

UNITED STATES PATENTS

| | | |
|---|---|---|
| 1,021,938 | MacKay | Apr. 2, 1912 |
| 2,088,123 | Toman | July 27, 1937 |
| 2,192,133 | Hagemeyer | Feb. 27, 1940 |